United States Patent
Berger et al.

(10) Patent No.: US 6,513,311 B1
(45) Date of Patent: Feb. 4, 2003

(54) AUTOMATIC CONFIGURATION OF DUAL CUTTER MODE WINDROWERS

(75) Inventors: John G. Berger, Landisville, PA (US); Philip J. Ehrhart, Narvon, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/032,533

(22) Filed: Jan. 2, 2002

(51) Int. Cl.[7] .......................... A01D 34/00; G06F 19/00
(52) U.S. Cl. ................ 56/10.2 R; 56/10.26; 56/255; 56/257; 56/264; 701/50
(58) Field of Search .................. 56/10.2 R, 10.2 A, 56/10.2 G, 10.2 H, 10.8, 10.9, 11.1, 255, 257, 264, 268, 271, DIG. 15; 460/1, 6; 701/50

(56) References Cited

U.S. PATENT DOCUMENTS

| | | | | |
|---|---|---|---|---|
| 4,527,241 A | * | 7/1985 | Sheehan et al. ......... 56/10.2 R |
| 4,873,644 A | * | 10/1989 | Fujii et al. ............... 56/10.2 R |
| 5,878,577 A | * | 3/1999 | Levrai et al. .................. 60/579 |
| 5,901,535 A | * | 5/1999 | Duckinghaus et al. ... 56/10.2 G |
| 6,073,431 A | * | 6/2000 | Osborne et al. ............. 56/15.7 |
| 6,167,685 B1 | * | 1/2001 | Berger et al. ............ 56/10.2 A |
| 6,205,384 B1 | * | 3/2001 | Diekhans ..................... 701/50 |
| 6,242,927 B1 | * | 6/2001 | Adams et al. ............... 324/664 |

* cited by examiner

Primary Examiner—Robert E. Pezzuto
Assistant Examiner—Nathan Mammen
(74) Attorney, Agent, or Firm—Larry W. Miller; John William Stader

(57) ABSTRACT

The cutter head of a windrower may carry a sickle bar or a disc as the cutting element. Each type of cutting element requires a different drive power to obtain a given set point speed. To determine the type of cutter being used, the magnitude of the signal required to bring the cutting element to a given set point speed is measured and compared to limits defining first and second, non-overlapping, ranges of signal magnitudes, one range being typical of sickle bar operation and the other range being typical of disc operation.

14 Claims, 2 Drawing Sheets

AUTOMATIC CONFIGURATION OF DUAL CUTTER MODE WINDROWERS

RELATED APPLICATIONS

This application incorporates by reference the disclosure of application Ser. No. 09/275,404, now U.S. Pat. No. 6,167,685, entitled Windrower Speed Control.

FIELD OF THE INVENTION

The present invention relates to windrowers for cutting a crop material and depositing the cut crop material in rows on a field. More particularly, the invention relates to dual mode windrowers, that is, windrowers wherein the header or cutter head for cutting the crop may include either a disc cutter or a sickle bar cutter. At windrower start-up, the invention automatically determines whether the header has a disc or sickle bar cutter as the cutting means, and adjusts the header drive speed accordingly.

BACKGROUND OF THE INVENTION

Some dual mode windrowers have heretofore been provided with a manually operated mode switch that an operator sets to a first state or a second state depending on whether a disc or a sickle bar cutter is to be used as the header cutting means. It is necessary for the windrower control system to know whether a disc or a sickle bar cutter is being used because the two types of cutters have different operating characteristics. For example, it takes significantly more operative power to obtain a given header speed when the header carries a disc cutter rather than a sickle bar. Thus, failure of the operator to properly set the mode switch when a new cutter is mounted on the header can result in poor fuel economy, unsatisfactory operation of the header during cutting, and possibly excessive wear and damage to the cutter.

SUMMARY OF THE INVENTION

An object of the present invention is to provide a control system for a dual mode windrower, the control system automatically determining whether the header carries a disc or a sickle bar cutter.

A further object of the invention is to provide a method and apparatus for automatically determining whether a windrower header is equipped with a disc or a sickle bar cutter.

Another object of the invention is to provide a method and apparatus for determining whether a windrower header is configured with a disc or a sickle bar and, from the determination, setting a configuration parameter for controlling drive power to the header.

At start-up, a drive signal for controlling header speed is increased until the header speed reaches a set point speed. When a sensor senses that the header has reached the set point speed, the magnitude of the drive signal that results in the set point speed is compared to upper and lower limits of a first range of signal magnitudes characteristic of the range of signal magnitudes normally required to drive the header at the set point speed when the header carries one type of cutter. If the drive signal magnitude does not fall within the first range of magnitudes, it is compared to upper and lower limits of a second range of signal magnitudes characteristic of the range of signal magnitudes normally required to drive the header at the set point speed when the header carries the other type of cutter. Header configuration data, determined from the comparisons, is stored in a memory and subsequently used by a microprocessor to derive drive signals for controlling the drive power to the header. The configuration data is used to select either first or second table of drive signal magnitudes, the tables being addressed by any set point speed value selected by an operator via a control panel. Thus, for any speed selected by the operator, the microprocessor generates a header drive signal having either a first or second magnitude depending on the determined configuration.

Although the invention permits elimination of any operator input regarding header configuration, it may be used in conjunction with an operator-controlled configuration data input means. In the latter case, the invention changes or overrides the operator input if the operator should input configuration data that does not agree with the actual header configuration.

Other objects and advantages of the invention, and its mode of operation will become obvious from consideration of the following description and accompanying drawings.

DESCRIPTION OF THE INVENTION

Although the principles of the invention are applicable to any windrower operable in dual cutter modes, the invention will be described with reference to the model HW340 marketed by New Holland North America, New Holland, Pa. This particular windrower is a self-propelled machine and is designed such that either a sickle-bar or disc cutter may be used as the crop cutting means.

Figure 1:
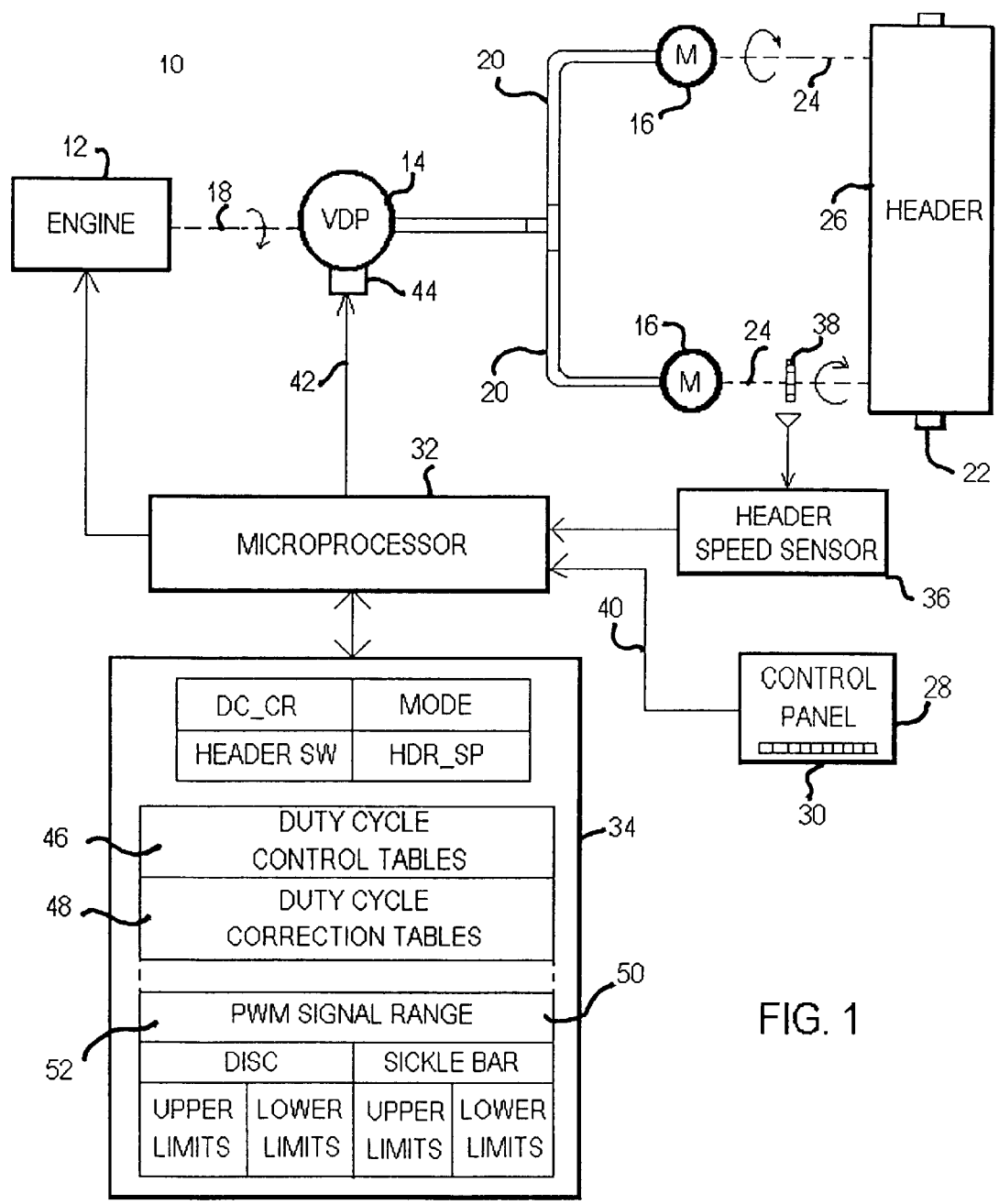
FIG. 1 illustrates a header drive system for powering and controlling the speed of a cutter head.

As shown in FIG. 1, the header drive system 10 for the model HW340 windrower comprises an engine or motor 12, a source of variable drive power such as a proportional or variable displacement hydraulic pump 14, and first and second hydraulic motors 16. Engine 12 drives pump 14 through a mechanical linkage 18 and also propels the windrower, but separate engines may be used. The output of pump 14 is connected via hydraulic lines 20 to the inputs of the hydraulic motors 16. Motors 16 drive opposite ends of a shaft 22 via mechanical linkages schematically illustrated at 24 so as to drive the header or cutter head 26. The header may comprise a conventional sickle bar cutter or a disc cutter such as the disc cutter disclosed in U.S. Pat. No. 5,761,890.

Control panel 28 is a conventional control panel including a display (not shown) for displaying a menu, and membrane switches 30 for making selections from the menu to thereby set various operating parameters of the windrower. Insofar as the present invention is concerned, these operating parameters include the configuration or mode (indicating whether the header 26 carries a disc or sickle bar), the on/off status of the header 26 (indicating whether or not drive power is to be applied to the header), and the desired or set point header speed. A program executed by a controller or microprocessor 32 detects the entries made via control panel 28 and stores the entries at locations MODE, HDR_ON/OFF and HDR_SP, respectively, in a memory 34 included within the microprocessor, the stored values then being retrieved from memory as needed to control various functions.

As disclosed in U.S. Pat. No. 6,167,685, the speed at which header 26 is driven may be controlled by a closed loop control means comprising a header speed sensor 36, the programmable microprocessor 32, the pump 14 and motors 16. The header speed sensor 36 is provided for sensing the current drive speed (RPM) of header 26. The speed sensor may be any form of sensor for sensing header speed but preferably comprises a magnetic sensor for sensing the leading and trailing edges of holes or slots on a wheel or gear 38 that is mounted so as to rotate with one of the mechanical linkages 24.

Each time sensor 36 senses the edge of a hole in wheel 38, it generates an interrupt signal on a lead 40 to interrupt microprocessor 32. The microprocessor includes a continuously running time stamp counter (not shown) and each time an interrupt signal is received an interrupt service routine saves the value in the counter as a time stamp. By taking the difference between time stamp values, an indication of the current speed (RPM) of wheel 38 may be obtained. Preferably, several indications of RPM are calculated and averaged to obtain a more accurate indication of the speed.

The speed of wheel 38 is an indication of the current header speed. Microprocessor 32 compares the current header speed with the set point header speed stored in memory 34 at the location HDR_SP. As explained in U.S. Pat. No. 6,167,685, the microprocessor 32 produces a pulse-width-modulated (PWM) signal at a frequency of, for example, 444 Hz to control pump 14. The microprocessor executes a timed interrupt every 2.25 ms to send this signal via lead 42 to a proportional control solenoid 44 that varies the displacement and output power (outflow) of pump 14.

Initially, the duty cycle of the PWM signal is determined by the header set point speed in memory location HDR_SP. The header set point speed is used to access a duty cycle control table 46 in memory 34. This table holds duty cycle control values that define the magnitude or duty cycle of the PWM signal. Microprocessor 32 transfers the accessed duty cycle control value to a duty cycle control register, DC_CR, that controls generation of the PWM signal applied to pump 14.

The PWM signal initially applied to the control solenoid 44 of pump 14 results in some header speed that is sensed by header speed sensor 36. Microprocessor 32 then determines the error or difference between the set point speed HDR_SP and the actual or sensed speed. The error is used to access a duty cycle correction table 48 in memory 34 that holds duty cycle correction values. A duty cycle correction value read from this table is used to modify the value in DC_CR. The modified value changes the duty cycle of the PWM signal on lead 42 thus tending to bring the actual header speed toward the set point speed. This process is repeated until the actual header speed is within a limited range or window of speeds centered about the set point.

Actually, the memory 34 stores two duty cycle control tables and two duty cycle correction tables. There is a first set of tables including a first duty cycle control table and a first duty cycle correction table for use when the header 26 includes a sickle bar cutter. There is also a second set of tables including a second duty cycle control table and a second duty cycle correction table for use when the header includes a disc cutter. The header configuration data stored at location MODE in memory 34 controls the microprocessor program to select the first set or second set of tables depending on whether the configuration data indicates 'sickle bar' or 'disc'.

The reason for two sets of tables is that the operating characteristics of a sickle bar cutter are different from those of a disc cutter. For a given header speed, it takes more operative power to drive a disc cutter than a sickle bar cutter. This means that to control the header 26 to a given header set point speed, the duty cycle of the PWM signal controlling pump 14 must be greater when a disc cutter is being controlled than when a sickle bar cutter is being controlled. This of course assumes that pump output flow is proportional rather than inversely proportional to the duty cycle. Typically, the magnitude of the duty cycle of the PWM signal, for a given header speed, is in a first range when a disc is mounted on the cutter head 26, and in a second when a sickle bar is mounted on the header. As described below, the present invention takes advantage of the fact that these ranges are non-overlapping to automatically determine whether a disc or sickle bar cutter is mounted on header 26.

Heretofore, operator actuation of the membrane switches 30 has been the sole means for setting the configuration data (MODE) instructing microprocessor 32 whether to use the first or second set of tables. If an operator incorrectly set the mode, or failed to change the mode upon changing from one type of cutter to the other, the header speed was not properly controlled. For example, if the mode was set for the disc mode but a sickle bar was being used, the header 26 would not run at the set point speed but would run at some significantly faster speed. The present invention overcomes this problem by automatically determining whether the cutter on header 26 is a disc or sickle bar and, if the stored configuration data entered by the operator via switches 30 is not correct, modifying the stored configuration data so that it correctly reflects the type of cutter on the header. The type of cutter is determined by (1) bringing the header speed to a selected header set point speed selected by the operator via control panel 28, (2) determining the magnitude of the PWM signal applied to pump 14 in order to reach the set point speed, (3) comparing the magnitude of the PWM signal necessary to reach the set point speed to a first range of PWM magnitudes required to drive a disc and a second range of magnitudes required to drive a sickle bar to determine the actual configuration, and (4) changing the configuration data stored in memory 34, if need be, to agree with the determined actual configuration.

Figure 2:
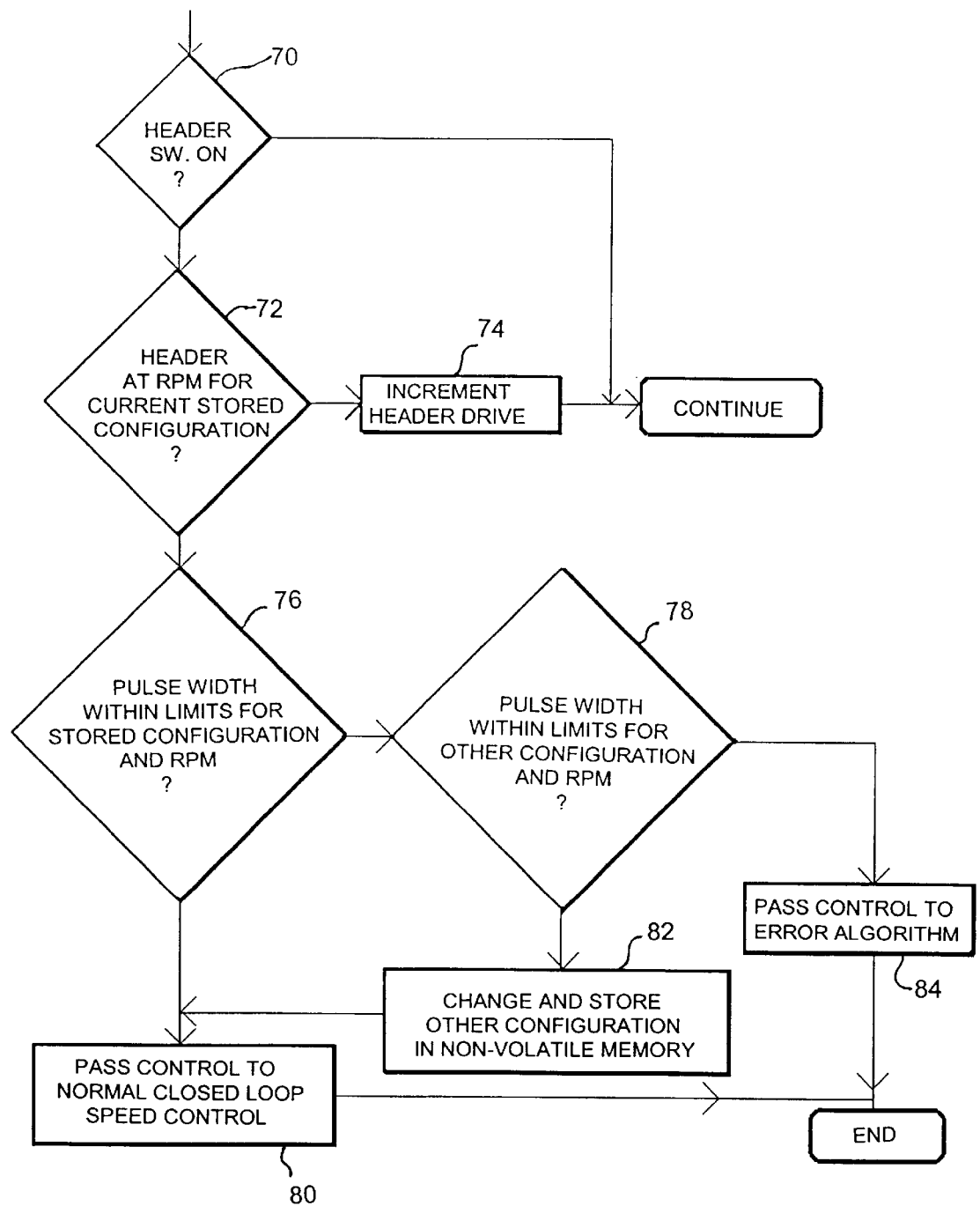
FIG. 2 is a flow diagram of a program executed by the microprocessor of FIG. 1 to determine the type of cutter head being used, and configure the system according to the determined type.

FIG. 2 illustrates a routine executed by the microprocessor 32 to automatically determine the type of cutter being used on the header 26, and control the drive power to the cutter head according to the determined type. It will be understood that the routine is part of a larger program executed by the microprocessor at periodic intervals on the order of about 20 ms.

Assume that the microprocessor is running and the operator has selected a header set point speed and selected either 'disc' or 'sickle bar' as the configuration. When the program reaches step 70 in FIG. 2, it tests the memory location HDR_ON/OFF to determine if the operator has turned on the header 26. If the header is not running, the program continues with other operations because there is no need to determine the type of cutter means on the header as long as the header is not being used.

Assume now that the operator, via control panel 28, turns the header on. On the first execution of step 70 after the header is turned on, this condition is detected at step 70 and the program advances to step 72. Step 72 compares the actual header speed sensed by header speed sensor 36 (currently zero) with the set point speed stored in location HDR_SP to determine if the header is running at the desired speed. Since the header is not yet running, the program advances to step 74.

Step 74 first checks location DC_CR to see if it is empty or contains a duty cycle control value. DC_CR is still empty so it is loaded with a duty cycle control value accessed using the header speed set point value in HDR_SP. The particular duty cycle control table 46 that is accessed is determined by the configuration indication in location MODE. The value loaded into DC_CR causes the microprocessor to apply a PWM signal to solenoid 44 so that outflow from pump 14 begins and the header is driven by motors 16.

After step 74 is executed, the program continues with other operations not related to the present invention. On the next execution of the program, steps 70 and 72 are carried out as previously described. When step 74 tests the contents of DC_CR, it finds that the location holds a non-zero value. Therefore, instead of accessing a duty cycle control value from one of tables 46, the microprocessor accesses a duty cycle correction value from one of tables 48. The particular duty cycle correction table that is accessed is determined by the configuration indication in location MODE. The difference between the set point speed in location HDR_SP and the actual header speed, as sensed by speed sensor 36, is used to address the table to obtain the correction value. The correction value is then added to DC_CR and the result returned to DC_CR so that the duty cycle of the PWM signal applied to the solenoid of pump 14 is increased, thereby increasing the drive power to header 26.

On each execution of the program, steps 70, 72 and 74 are executed as previously described. As the speed of the header increases, the difference between the set point speed and the actual header speed as sensed by speed sensor 36 decreases so that different duty cycle correction values are added to the value in DC_CR. Steps 70, 72 and 74 are repeated until step 72 detects that the actual header speed is equal to the set point speed specified by HDR_SP. The program then advances to step 76.

Step 76 determines if the magnitude (pulse width) of the PWM signal required to drive the header 26 to the set point speed specified by HD_SP falls within a range of signal magnitudes normally required to drive the header when it carries a cutter of the type specified by the configuration data in location MODE. As previously explained, it takes more power to drive header 26 at a given speed when the cutter means is a disc than when the cutter means is a sickle bar. Thus, the duty cycle of the PWM signal applied to the control solenoid 44 of pump 14 must be greater when a disc is being used. Although, between headers carrying the same type of cutter, there is a slight variation in the duty cycle required for driving the headers at the same speed, the magnitude of the PWM signal necessary to drive disc-equipped headers at a given speed falls within a range of magnitudes that does not overlap the range of magnitudes necessary to drive headers equipped with sickle bars at the same speed.

ROM 50 stores two PWM Signal Range tables 52, one for discs and one for sickle bars. Each addressable location in these tables stores two values, one representing an upper limit and the other representing a lower limit of a range of PWM signal magnitudes. The range of magnitudes in each location is large enough to encompass the variation in PWM signal between headers carrying the same type of cutter and driven at the same speed. These values are expressed in units such that if, for example, an upper limit value were loaded into DC_CR, the microprocessor 32 would generate a PWM signal having a magnitude at the upper limit.

Tables 52 are addressed using the set point speed in location HD_SP. However, to conserve memory space, there is not a location in each table corresponding to each possible speed. Instead, a range of set point speeds addresses a single table location. This may be accomplished, for example, by truncating the value in HD_SP so that several of the low order bits are not used when addressing a table.

Step 76 selects one of tables 52 depending on the configuration data in location MODE, and addresses a location in the selected table using HD_SP to obtain the upper and lower limits of a range of PWM signal values. The magnitude of the PWM signal that caused the header to reach the set point speed should fall within these limits. Step 76 compares the magnitude of the value in DC_CR to each limit value. If the comparison shows that the value in DC_CR is at least as great as the lower limit but no greater than the upper limit, it means that the configuration data in location MODE corresponds to the type of cutter on header 26. The routine advances to step 80 to pass control to the normal closed loop speed control. This may be done, for example, by setting a flag or flags that prevent the program from reaching step 70 and enable the portion of the program that normally performs the header speed control function. Thus, the routine shown in FIG. 2 is not executed once step 76 determines that the configuration data in location MODE agrees with the actual header configuration.

If step 76 determines that the magnitude of the value in DC_CR does not fall within the upper and lower limits read from a table 52, it means that the configuration data in location mode does not agree with the type of cutter on header 26, or there is a system error. Step 78 determines if the configuration data in location MODE is incorrect by accessing the PWM Signal Range table 52 that was not accessed at step 76. That is, the disc table is accessed at step 78 if the sickle bar table was accessed at step 76, or the sickle bar table is accessed at step 78 if step 76 accessed the disc table. The set point speed in HD_SP is used to address the table and read out the limit values that are then compared to the value in DC_CR. If the comparison shows that the magnitude of the value in DC_CR falls within the limits read from the table, it means that the configuration data in location Mode does not agree with the type of cutter on header 26. In this case step 82 changes the configuration data in location Mode to agree with the actual header configuration. Step 80 is then executed to pass control to the normal closed loop speed control as previously described.

Preferably, the location MODE is in a non-volatile memory that is read at start-up, that is, when the microprocessor 32 is turned on. This permits elimination of the mode setting function from the control panel switches 30. At start-up, the routine of FIG. 2 first uses the stored configuration data. If the header configuration has been changed, step 76 will detect that the magnitude of the PWM signal is not within limits for the stored configuration data. Assuming no malfunction, step 78 will direct the routine to step 82 that will change the configuration data to correspond to the type of cutter on header 26.

Thus, the invention may operate to over-ride an erroneous selection of configuration by the operator, or it may operate automatically to determine the configuration thus eliminating the need for the operator to enter the configuration data.

In FIG. 2, if steps 76 and 78 determine that the magnitude of the PWM signal is not within the characterized limits for either a sickle bar or a disc configuration, it means that there is a problem, either a system malfunction or an operator error. Since the routine can not determine the correct configuration, step 84 is executed to pass control to an error algorithm thus terminating the routine shown in FIG. 2.

Although the invention has been described as applied to a specific windrower, it will be obvious that various modifications and substitutions may be made in the described embodiment without departing from the spirit and scope of the invention as defined by the appended claims. For example, the drive system for header 26 need not be a hydraulic system or, if hydraulic, need not have a variable displacement pump. The microprocessor output signal for controlling the drive system need not be a PWM signal but may be any electrical signal of variable magnitude.

We claim:

1. In a windrower having a header including a cutter comprising, interchangeably, a disc or a sickle bar; and a closed loop control system producing a drive signal for controlling the speed of said header to a selected set point speed by varying the output power of a power source driving said header, said header requiring a different power from said power source to run at a selected set point speed when said cutter is a disc than when said cutter is a sickle bar, an apparatus for automatically determining whether said cutter is a disc or a sickle bar, said apparatus comprising:

means for selecting a set point speed at which said header is to be driven;

means operable when the speed of said header reaches said selected set point speed for determining whether the magnitude of said drive signal falls within a first range or a second, non-overlapping range of signal magnitudes; and, a configuration data store for storing configuration data indicating that said cutter is a disc when the magnitude of the drive signal required to drive said header at said selected set point speed falls within said first range of signal magnitudes, or indicating that said cutter is a sickle bar when the magnitude of the drive signal required to drive said header at said selected set point speed falls within said second range of signal magnitudes, said first and second ranges of signal magnitudes being non-overlapping.

2. An apparatus as claimed in claim 1 wherein said storage means comprises a non-volatile memory.

3. An apparatus as claimed in claim 1 wherein said closed loop control system comprises a microprocessor programmed to compare a sensed header speed with said set point speed and increase the magnitude of said drive signal until said sensed header speed is as great as said set point speed.

4. An apparatus as claimed in claim 3 wherein said means for determining whether the magnitude of said drive signal falls within said first range of magnitudes or said second range of magnitudes includes memory means for storing two tables having locations addressable by said microprocessor using said selected set point speed, said microprocessor addressing a first or a second of said tables depending on whether said configuration data store holds an indication that said cutter means comprises a disc or a sickle bar, respectively.

5. An apparatus as claimed in claim 4 wherein, at each addressable location, said two tables include an upper limit value and a lower limit value defining the range of magnitudes within which the magnitude of said drive signal must fall when said header is configured as specified by said configuration data store and is driven at said selected set point speed.

6. An apparatus as claimed in claim 5 wherein said means for determining whether the magnitude of said drive signal falls within said first or second range of magnitudes comprises means in said microprocessor for comparing the magnitude of said drive signal with an upper limit and a lower limit from a first of said tables and, when the magnitude of said drive signal is not in a range of magnitudes within the limits from said first table, comparing the magnitude of said drive signal with an upper limit and a lower limit from a second of said tables.

7. An apparatus as claimed in claim 6 wherein, if the comparison of the magnitude of said drive signal said upper and lower limits from said second table determines that the magnitude of said drive signal is within said second range, said microprocessor changes said configuration data so that it corresponds to the type of cutter included in said header.

8. An apparatus as claimed in claim 7 and further comprising an operator panel for initially entering configuration data into said configuration data store.

9. An apparatus as claimed in claim 7 wherein said microprocessor applies a pulse-width-modulated drive signal to said power source to control the speed of the header.

10. An apparatus as claimed in claim 8 wherein said configuration data store is a non-volatile memory.

11. An apparatus as claimed in claim 7 wherein said microprocessor automatically determines and enters the configuration data in said configuration data store.

12. An apparatus as claimed in claim 11 wherein said configuration data store is a non-volatile memory.

13. In a windrower having a header including a cutter comprising, interchangeably, a disc or a sickle bar; and a closed loop control system producing a drive signal for controlling the speed of said header to a selected set point speed by varying the output power of a power source driving said header, said header requiring a different power from said power source to run at a selected set point speed when said cutter is a disc than when said cutter is a sickle bar, a method for automatically determining whether said cutter is a disc or a sickle bar, said method comprising the steps of:

selecting a set point speed;

increasing the magnitude of said drive signal to increase the output power driving said header until the speed of said header is equal to the selected set point speed;

detecting when the speed of said header is equal to said selected set point speed;

when the speed of said header is equal to said selected set point speed, storing an indication that said cutter is a disc when the magnitude of the drive signal required to cause said header to run at said selected set point speed falls within a first range of signal magnitudes, or storing an indication that said header comprises a sickle bar when the magnitude of the drive signal required to drive said header at said selected set point speed falls within a second range of signal magnitudes, said first and second ranges of signal magnitudes being non-overlapping.

14. A method of determining whether the header of a windrower includes a disc cutter or a sickle bar cutter, a disc cutter requiring more drive power from a drive power source than a sickle bar cutter to run at a given set point speed, said method comprising:

providing a first table of values, said first table storing values defining at least the limits of a range of drive power signal magnitudes necessary for said drive power source to drive a disc cutter at said set point speed;

providing a second table of values, said second table storing values defining at least the limits of a range of drive power signal magnitudes necessary for said drive power source to drive a sickle bar cutter at said set point speed;

applying a drive power signal to said drive power source until said header runs at said set point speed;

determining if said header includes a disc cutter or a sickle bar cutter by determining if the magnitude of the drive power signal causing said header to run at said set point speed falls within limits defined by values in said first or said second table.

* * * * *